April 3, 1928.
G. E. SAVAGE
HANDLED NESTED CUPS
Filed Jan. 22, 1925
1,665,179
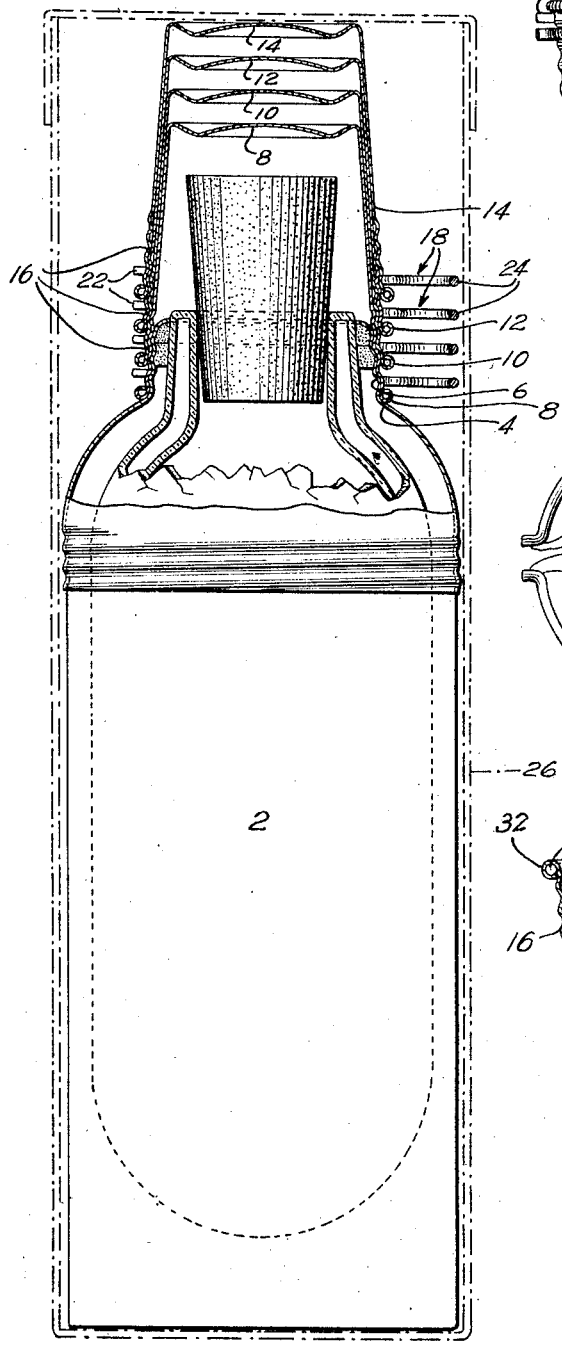
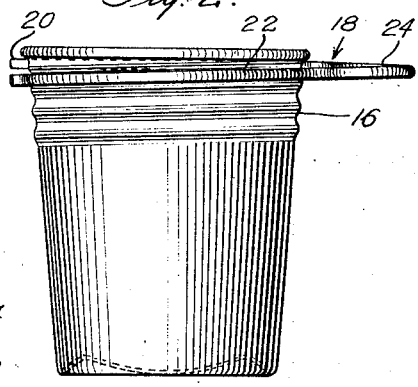
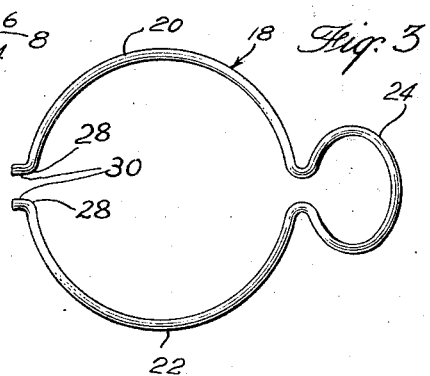
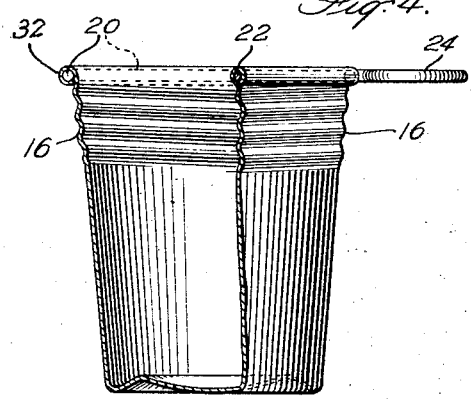
INVENTOR
GEORGE E. SAVAGE
BY
ATTORNEYS Patented Apr. 3, 1928.

1,665,179

UNITED STATES PATENT OFFICE.

GEORGE E. SAVAGE, OF MERIDEN, CONNECTICUT, ASSIGNOR, BY MESNE ASSIGNMENTS, TO MANNING, BOWMAN & CO., OF WILMINGTON, DELAWARE, A CORPORATION OF DELAWARE.

HANDLED NESTED CUPS.

Application filed January 22, 1925. Serial No. 3,943.

My invention relates to handled nested cups, and more particularly to nested cups for vacuum bottles, and has for its object to provide the individual nested cups with handles which shall not interfere with the nesting or with the insertion in an outer container of a vacuum bottle having cups nested thereon. It further has for its object to provide easily removable, non-interfering handles for nested cups.

The following is a description of the preferred embodiment of my invention, reference being had to the accompanying drawings, in which, Figure 1 is a side elevation of a vacuum bottle with the upper part broken away so as to show a section of the same and provided with a plurality of nested cups embodying my invention;

Fig. 2 is a side elevation of a single cup with its handle;

Fig. 3 is a plan view of the handle detached; and

Fig. 4 is a side elevation of a modification showing a cup with the handle permanently secured.

Referring more particularly to the drawings, 2 is a vacuum bottle having a reduced neck 4 provided with external screw-threads 6. 8, 10, 12 and 14 are four cups nested one within another, each having internal and external engaging screw-threads 16, the internal screw-threads of the lower cup 8 engaging the screw-threads 6 on the neck of the bottle.

18 are U-shaped handles having arms 20, 22 surrounding the axis of the cups and engaging the external screw-threads. In the form shown the closed end of the U-shaped handle is provided with a projecting loop 24 constituting a grip portion which may be grasped by the thumb and finger so that each cup has a handle portion which can be easily grasped. The handle is preferably made of spring wire. The handle on each cup is closely adjacent to its lip and in its entirely lies substantially in a plane parallel to the lip of the cup. The projecting loops 24 terminate substantially at the extension of the cylindrical walls of the bottle 2 and therefore do not interfere with the insertion of the bottle and cups with the handles in situ into an external casing 26 shown in dotted lines.

In applying a handle, a cup is inserted endwise between the arms and forced into the position shown by pushing or screwing. It can be easily removed by a reverse action. The arms 20—22 yield in a direction parallel to the axis of the cup so as to conform to the screw threads, as shown in Fig. 2. The arms are provided with rounded surfaces 28 by bending outward the ends 30, so as not to mar the cup during the screwing action.

If desired, each handle may be permanently secured to its cup by turning the edge of the cup over the cup engaging arms of the handles as shown at 32 in Fig. 4. In this case the portions 30 may be omitted.

As will be evident to those skilled in the art, my invention permits of various modifications without departing from the spirit thereof or the scope of the appended claims.

What I claim is:

1. The combination of a plurality of nested cups fitted one upon another and having engaging external and internal screw-threaded portions, a spring wire handle for each cup having curved portions embracing the axis of said cup and engaging the external screw-threads thereof adjacent to the lip of the cup, each handle having an integral grip portion and being in its entirety in a plane approximately parallel to the lips of said cups.

2. The combination of a plurality of nested cups fitted one upon another and having engaging external and internal screw-threaded portions, a spring wire handle for each cup having curved portions embracing the axis of said cup and engaging the external screw-threads thereof adjacent to the lip of the cup, each handle having an integral grip portion and being in its entirety in a plane approximately parallel to the lips of said cups, said handles being U-shaped and having their grip portions in the form of integral projecting loops located at their closed ends.

In testimony whereof, I have signed my name to this specification this 20th day of January, 1925.

GEORGE E. SAVAGE.